United States Patent
Lienesch et al.

(10) Patent No.: US 6,706,367 B2
(45) Date of Patent: Mar. 16, 2004

(54) ADHESIVE CONNECTION BETWEEN AN ADHESION SURFACE OF A BODY AND A CORRESPONDING ADHESION SURFACE ON THE OUTSIDE OF A MACHINE HOUSING

(75) Inventors: Hans-Jurgen Lienesch, Hoerstel (DE); Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 160 days.

(21) Appl. No.: 09/956,945

(22) Filed: Sep. 21, 2001

(65) Prior Publication Data

US 2002/0012770 A1 Jan. 31, 2002

Related U.S. Application Data

(62) Division of application No. 09/780,379, filed on Feb. 12, 2001, which is a division of application No. 09/262,559, filed on Mar. 3, 1999, now abandoned, which is a division of application No. 08/894,107, filed as application No. PCT/EP95/04939 on Dec. 13, 1995, now abandoned.

(51) Int. Cl.[7] .................................................. B32B 3/28
(52) U.S. Cl. ........................ 428/167; 428/161; 428/172
(58) Field of Search ................................. 428/156, 161, 428/130, 192, 157, 167, 172, 343, 344

(56) References Cited

U.S. PATENT DOCUMENTS

| 4,101,137 A | 7/1978 | Travis |
| 4,367,650 A | 1/1983 | Hilgner et al. |
| 4,399,705 A | 8/1983 | Weiger et al. |
| 4,823,602 A | 4/1989 | Christensen, Jr. |
| 4,858,470 A | 8/1989 | Kincaid et al. |
| 4,905,518 A | 3/1990 | Kubler |
| 4,940,633 A | 7/1990 | Hermansen et al. |
| 5,073,430 A | * 12/1991 | Aidan .................... 428/43 |
| 5,723,787 A | 3/1998 | Stoddard et al. |

FOREIGN PATENT DOCUMENTS

| EP | 0368728 B1 | 3/1989 |
| EP | 0321600 B1 | 12/1997 |
| GB | 589260 | 6/1947 |
| JP | 88145509 | 6/1998 |
| WO | WO 96/36855 | 11/1996 |

* cited by examiner

*Primary Examiner*—Donald J. Loney
(74) *Attorney, Agent, or Firm*—Nixon Peabody LLP; David S. Safran

(57) ABSTRACT

A body to be bonded to a machine housing. The body may include a substantially flat adhesion surface provided with an undercut portion. The undercut portion may form a disc-like shoulder and an acute, wedge-shaped edge with the periphery of the adhesion surface, wherein the wedge-shaped edge is oriented to face away from the adhesion surface and to oppose the shoulder. The machine housing may further be provided with grooves adapted to improve the strength of a bond between an adhesive material and the adhesion surface.

7 Claims, 1 Drawing Sheet

ADHESIVE CONNECTION BETWEEN AN ADHESION SURFACE OF A BODY AND A CORRESPONDING ADHESION SURFACE ON THE OUTSIDE OF A MACHINE HOUSING

This is a divisional application of U.S. patent application Ser. No. 09/780,379 filed on Feb. 12, 2001 pending which is a divisional of U.S. patent application Ser. No. 09/262,559 filed Mar. 3, 1999 now abandoned; which is a divisional application of U.S. patent application Ser. No. 08/894,107 filed Aug. 12, 1997 now abandoned which is the United States National Stage of PCT International Application No. PCT/EP95/04939, filed Dec. 13, 1995, and claims priority from the PCT Application Under 37 U.S.C.§ 119.

DESCRIPTION OF THE INVENTION BACKGROUND

The invention relates to a metallic body to be bonded to the outside of a housing, i.e. shell or encasing, especially a vibrating machine. In addition, the invention especially relates to the housing of a sensor intended for transforming a physical quantity, in particular vibration, into a corresponding electrical signal, or relates to an adaptor for attaching such a sensor to the housing of a machine, the body exhibiting a substantially flat adhesion surface, and the invention relates to an adhesive connection between the adhesive surface of such a body and a corresponding opposite adhesive surface situated on the outside of a machine housing.

Sensors for transforming a physical quantity into a corresponding electrical signal, for example, acceleration sensors for transforming signals of vibration into a corresponding electrical signal, frequently have to be fastened to the housing of a machine in a durable and reliable manner, as well as in a suitable manner that allows an undistorted and essentially undamped transmission of the physical quantity to be transformed. This should be done either by direct action or, in the case the sensor is intended for easy dismounting, by means of an adaptor which has to be fastened to the housing of a machine in a corresponding manner.

A known method of attaching will provide a sensor or adaptor to be screwed onto the housing of a machine, such housing being provided with a threaded hole of comparatively extensive diameter, and a solid threaded stub that extends from the housing of the sensor or of an adaptor, will be screed into said threaded hole. This known method of fastening requires considerable amounts of work and is timeconsuming, especially in the case the threaded hole will have to be provided to the machine after the machine has been placed to its intended working position, which is the most frequent case.

In addition, the aforementioned known method of attaching a sensor or and adaptor to a housing of a machine will not be applicable in case the housing must not be drilled into.

In order to avoid the aforementioned difficulties it has been suggested already, to bond the sensor or the adaptor to the housing of a machine by gluing.

Especially with vibrating machinery the problem had not yet been solved, to attain an adhesive connection between a sensor or an adaptor and the housing of a machine which will be long-lasting and which will have strength of such quality to assure a reliable bonding.

The underlying problem, and therefore an object of the invention, is to design both the body to be bonded and the adhesive connection in such manner, that a permanent attachment of the sensor will be effected solely by gluing, i.e. without the necessity of drilling a screw hole (tap hole) of large dimension into the housing of a machine.

SUMMARY OF THE INVENTION

The aforementioned problem will be solved for one part by providing a design of the metallic body to be bonded in accordance with claim 1 and for another part by the specific creation or design of the adhesive connection between such body and the housing of a machine.

The characteristics of claim 1 will assure, that an adhesive (or glue) which is supplied in a sufficient amount between metallic body and the housing of a machine will not only be distributed reliably about the adhesion surface while the metallic body and the housing of the machine will be made to rotatably approach each other. Moreover, the adhesive will also be drawn into the region of an undercut direct adjacent to the adhesion surface, in a claw-giving fashion, onto the dorsal (back) side of the wedge shaped form (of the undercut). This will produce an especially strong connection between a housing of a machine and the metallic body once the adhesive has cured. A prerequisite for this kind of connection is, that the amount of adhesive that is supplied to a body designed according to claim 1 and a housing of a machine, will be more than an amount that would be sufficient only to cover the adhesion surfaces. Also, the metallic body will have to approach the housing of a machine in a rotating way about an axis of rotation that is perpendicular to the adhesion surface, preferably about ca. the central longitudinal axis of the metallic body.

The invention may not only be used with advantage when bonding sensors or adaptors for sensors to a housing of a machine, but also is of advantage for attachment of any metallic body to machines by bonding or gluing, in particular for attaching to those machines that may vibrate and which require a permanent connection of high strength of stability.

BRIEF DESCRIPTION OF THE DRAWINGS

Subsequently, the invention will be explained in more detail, referring to the drawing of a preferred embodiment.

In the accompanying drawing, it is shown by

In FIG. 1 a metallic body 1 is shown from a side view, being adhesively bonded to a housing 2 of a machine. The housing 2 of a machine is shown in longitudinal section along a sectional plane which includes a centerline 3, which centerline defines a rotational symmetry of body 1. Also, adhesive 5 is shown in a cutaway view along said sectional plane.

Figure 1:
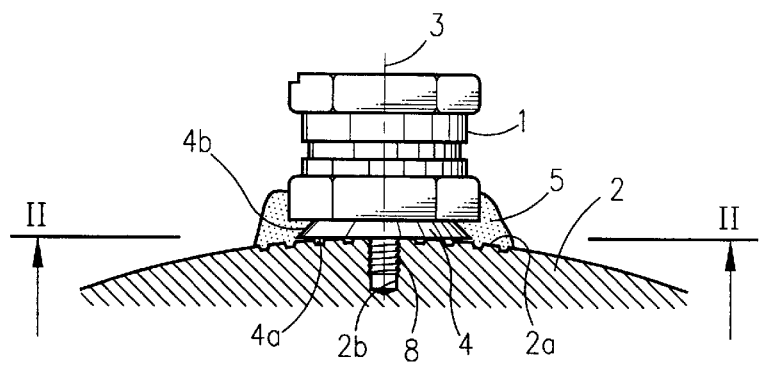
FIG. 1: a side view, partly as a longitudinal section, of a metallic body relating to the form of a sensor or an adaptor for a sensor, the body being attached to the housing of a machine

In the drawing if FIG. 1 only a part of the housing 2 of a machine is shown, being of proximity to body 1. The machine may constitute for example a motor, or a generator, or the like, the vibrations of such machine being measured e.g. in order to monitor the wear of a rolling-bearing provided for its rotor. For this purpose, an acceleration sensor is set onto (lit: in) and contacting the metallic body 1, or else, body 1 constitute an adapter for receiving a separate sensor intended for acceleration measurements, such that the sensor may be fastened to the adaptor, but allowing for easy disengagement of same.

Metallic body 1, on its face side that is oriented towards the housing 2 of a machine, exhibits a disk-like shoulder 4, body and shoulder being unitary and made from the same piece of material. Also, the face area of body 1 oriented towards the housing 2 of a machine is constituting an adhesion surface 4a for adhesively bonding body 1 to an opposite adhesive surface 2a of a housing 2 of a machine.

The disk-like shoulder 4 is formed in such way, that the adhesion surface 4a is adjoined or supplemented, towards the central volume of body 1, by an undercut 4b which forms an acute, wedge-shaped edge with the periphery of the adhesion surface 4a. Thus, the mentioned shoulder will be formed like a truncated cone turned upside down. Using a design of this kind will effect a sufficient amount of adhesive 5 that is applied to adhesive surface 2a and which amount is greater compared to an amount required for only covering adhesion surfaces 2a and 4a, to be drawn into the undercut 4b in a reliable manner. After curing, the adhesive will set behind the undercut in a claw-like fashion around the periphery of the disk-like shoulder 4. By this an especial strong and vibration-resistant permanent connection between metallic body 1 and housing 2 of a machine will be obtained, as soon as the adhesive has hardened.

Figure 2:
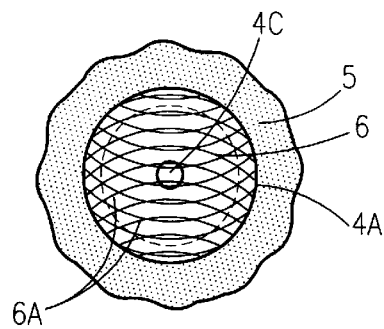
FIG. 2: a cross section along cutting line II—II of FIG. 1 through the adhesive connection between the metallic body and the housing of a machine

In order to even improve the bonding strength of adhesive 5 against adhesion surface 4a of body 1, this surface will be pre-formed with multiple grooves 6, as shown in FIG. 2, and the single grooves 6a having an arc-like curvature, e.g. the demonstrated embodiment shows arcs of circles that intersect each other.

In order to improve the bonding strength of the adhesive 5 against an opposite adhesion surface 2a of the housing of a machine, this surface is also provided with a set of multiple grooves 7, the single grooves 7a of which intersect according to a pattern of checkers (karoartig). The embodiment, presented as an example, shows these grooves to be straight. However, they may exhibit an arc-like curvature comparable to grooves 6a of adhesion surface 4a.

It is preferred, to have opposite adhesive surface 2a of housing 2 of a machine, as well as adhesion surface 4a of body 1, of essentially flat shape.

Figure 4:
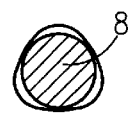
FIG. 4: a cross section (to enlarged scale) of a thread grooving stud that is additionally provided for an adhesive connection according to FIG. 1.

Usually, it will take some time before the adhesive has hardened, which has been applied to adhesion surfaces 2a and 4a and which adhesive, after said adhesion surfaces have been placed closely to each other, has progressed into undercut 4b. Therefore, it is advised to stabilize the position of body 1 relative to housing 2 by additional means. For this purpose, it is intended to utilize a stud 8 which is provided with a thread for cutting or generating threadlike grooves, the cross section of said stud being of polygon shape (cf. FIG. 4). Stud 8 may be screwed into a central bore-hole within adhesion surface 4a or also into a central bore-hole of adhesion surface 2a of a housing 2 of a machine, with the thread of the stud being worked into the walls of said bore-holes, and the bore-holes being oriented perpendicular to the mentioned adhesion surfaces.

The primary function of this thread grooving stud 8 is not intended to fasten body 1 onto a housing 2 of a machine, but rather to secure body 1 to its predefined final position, whilst the adhesive has not hardened. Of course, this stud will improve the strength of the connection to a certain degree once the adhesive has hardened, however, the adhesive connection is of such design, that it will exhibit sufficient permanent strength of the bonding after the adhesive has hardened, even without this thread-grooving stud 8.

Figure 3:
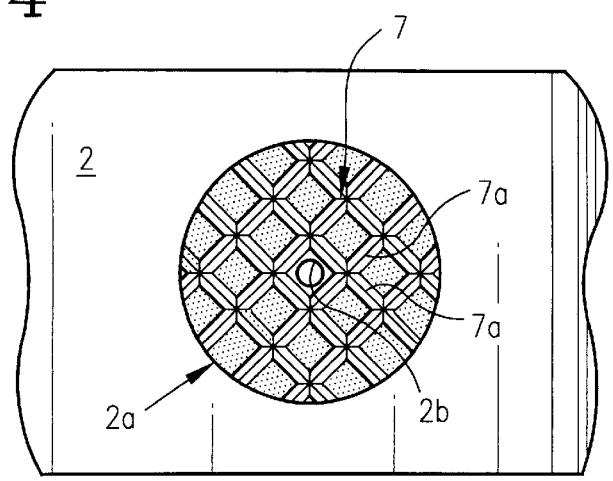
FIG. 3: a plan view of the adhesion surface on the housing of a machine, intended for bonding the metallic body onto it.

FIGS. 2 and 3 do not show the thread-grooving stud 8. In case it is allowed to drill into the housing 2 of a machine so as to furnish a corresponding borehole 2b, this stud will be screwed into bore-hole 4c of body 1 as well as into borehole 2b of housing 2. However, an intended adhesive connection from body 1 to housing 2 of a machine may be rendered as well, in case it is not allowed to make a bore-hole 2b into a corresponding housing 2 of a machine.

According to the invention, it is preferred to use a metal based glue 5 consisting of a plastic base-material and a metallic filler (e.g. so called plastic-steel). This not only will yield the intended mechanical connection of very high strength between body 1 and the housing 2 of a machine, but also will produce a most possible undamped and undistorted transfer of a physical quantity to be studied, which is vibration in the embodiment discussed as a preferred example, in direction towards the sensor. The reason for this is, that an adhesive of this type has also very good properties regarding that aspect, because of its incorporated metal filler.

What is claimed is:

1. An adhesive connection between an adhesion surface of a body and a corresponding opposite adhesion surface on the outside of a housing of a machine, comprising:

an adhesive for producing an adhesive connection used in such an amount, that, by the action of rotational movement, the adhesive will be drawn into an undercut which is situated behind the adhesion surface of said body, when said adhesion surface of said body and said opposite adhesion surface of a housing of a machine rotatably approach each other, wherein the opposite adhesion surface of said housing of a machine is a flat or plane in which surface has pre-formed therein a group of grooves for improving the bonding strength between said adhesive and said surface.

2. The adhesive connection according to claim 1, characterized by the grooves of the group of grooves on the opposite adhesion surface intersecting each other.

3. The adhesive connection according to claim 1, further comprising a plurality of grooves on an adhesion surface of said body, wherein said plurality of grooves have curvatures in the shape of arcs of circles.

4. The adhesive connection according to claim 1, characterized by using an adhesive intended for bonding metal parts, said adhesive having the following function:

first, to serve as an adhesive or glue, second to constitute a mass provided for transmittal of a physical quantity from the housing of a machine towards said body, said adhesive being made from a mixture of a plastic-based substance and a filler consisting of metal.

5. An adhesive connection, comprising:

a body having an adhesion surface and defining an undercut;

a housing having an adhesion surface, wherein said body and said housing define a space therebetween;

an adhesive connecting said body and said housing, wherein said adhesive fills said undercut and said space, said adhesive is drawn into said undercut by rotating said body and said housing relative to one another, wherein said housing adhesion surface is flat and has a plurality of intersecting grooves.

6. The adhesive connection of claim 5, wherein said body adhesion surface has a plurality of grooves.

7. The adhesion connection of claim 6, wherein said plurality of grooves are arcuate shaped.

* * * * *